United States Patent [19]

Ganzel

[11] Patent Number: 6,082,832
[45] Date of Patent: Jul. 4, 2000

[54] VEHICULAR BRAKING SYSTEM WITH SLAVED DUMP VALVE, CHECK VALVES AND RESTRICTORS

[75] Inventor: Blaise J. Ganzel, Ann Arbor, Mich.

[73] Assignee: Kelsey Hayes Company, Livonia, Mich.

[21] Appl. No.: 08/927,746

[22] Filed: Sep. 11, 1997

Related U.S. Application Data

[60] Provisional application No. 60/026,111, Sep. 13, 1996.

[51] Int. Cl.[7] .................................................. B60T 8/36
[52] U.S. Cl. ........................ 303/119.1; 303/900; 303/901
[58] Field of Search ................................. 303/10, 115.4, 303/116.1, 113.2, 11, 139, 113.4, 116.2, 9.62, 113.5, 186, 900, 901, 84.1, 84.2

[56] References Cited

U.S. PATENT DOCUMENTS

| | | | |
|---|---|---|---|
| 5,441,336 | 8/1995 | Takeuchi ............................... | 303/116.1 |
| 5,584,540 | 12/1996 | Takeuchi et al. ..................... | 303/116.1 |
| 5,673,979 | 10/1997 | Kuromitsu et al. .................. | 303/116.1 |
| 5,746,487 | 5/1998 | Naito et al. ........................... | 303/158 |
| 5,788,342 | 8/1998 | Noguchi ............................... | 303/116.2 |

*Primary Examiner*—Robert J. Oberleitner
*Assistant Examiner*—Melanie Talavera
*Attorney, Agent, or Firm*—MacMillan, Sobanski & Todd, LLC; A. Michael Tucker

[57] ABSTRACT

A slaved dump valve for an anti-lock brake system having two driven rear wheels and traction control includes a check valve and restrictor. In particular the dump valve includes a 2-way/2-position solenoid valve connected to the return conduit of each rear wheel brake cylinder for reducing the pressure at both of the wheel brake cylinders simultaneously. Each return conduit of each rear wheel brake cylinder connected to the slave dump valve contains a check valve oriented to prevent pressurized fluid from flowing from one rear wheel brake cylinder to the other. A restrictor is positioned in each return conduit to allow the pressure at each of the rear wheel brake cylinders to be reduced immediately when the dump valve is opened. Fully independent pressure regulation of the rear wheel brake cylinders connected to the single dump valve can be simulated by controlling inlet valves in conjunction with the single dump valve.

18 Claims, 3 Drawing Sheets

CHECK VALVES ONLY

VEHICULAR BRAKING SYSTEM WITH SLAVED DUMP VALVE, CHECK VALVES AND RESTRICTORS

CROSS-REFERENCE TO RELATED APPLICATION

This claims the benefit of U.S. provisional patent application identified as application Ser. No. 60/026,111, filed Sep. 13, 1996.

BACKGROUND OF THE INVENTION

This invention relates in general to hydraulic brake systems and in particular to anti-lock brake systems (ABS) with integral traction control (TC).

Various anti-lock brake systems for motor vehicles have been proposed to prevent wheel lock-up during brake actuation. Wheel rotational behavior is monitored and the corresponding wheel brakes are selectively applied and relieved in order to maintain the wheel speed within a selected slip range while achieving maximum braking forces. Transducers measure wheel rotational behavior and vehicle velocity and supply this information to control electronics. The control electronics control pressure regulating devices which selectively control the pressure at the wheel brake cylinders for proper brake actuation in response to the prevalent braking conditions. Typically, when activated, these systems operate in three pressure control modes, pressure apply, pressure dump and pressure hold. The pressure regulating devices provide the wheel brake cylinders with a pressure increase during the apply mode, a pressure decrease during the dump mode and maintain a constant pressure during the hold mode.

Generally, prior art systems use 2-way/2-position valves as pressure regulating devices for simplicity and cost reduction. A typical circuit configuration for each wheel brake cylinder consists of 1 inlet valve located between a pressurized fluid source and the wheel brake cylinder for pressure application and 1 dump valve located in a return conduit between the wheel brake cylinder and the inlet port of a pressurized fluid source for relieving pressure at the wheel brake cylinder. This results in eight 2-way/2-position valves per anti-lock system.

Traction control of two driven wheels can be added to these systems by including only two additional valves. Traction control reduces wheel spin when the vehicle is accelerating by selectively actuating the brakes of the driven wheels without driver intervention. Control electronics control the same inlet and dump valves used in the anti-lock system to regulate the brakes of the driven wheels during similar apply, dump and hold modes.

Prior art anti-lock systems have used a single slaved dump valve in an attempt to reduce the number of valves required to perform proper pressure regulation. These systems connect the return conduits of two wheel brake cylinders together and use a single 2-way/2-position solenoid valve to relieve the pressure at both wheel brake cylinders. Typically these systems use check valves to prevent pressurized fluid from flowing from one wheel brake cylinder to the other. Such systems have reduced the valve count but sacrifice independent control of the fluid pressure at the two wheel brake cylinders connected to the single dump valve.

SUMMARY OF THE INVENTION

The present invention concerns the use of a single dump valve connected to two wheel brake cylinders by return conduits, each return conduit having a restrictor and check valve that enable simulated independent control of the pressures at each corresponding wheel brake cylinder. While the preferred embodiment of the invention is an anti-lock and traction control braking system, the present invention can also be incorporated in a vehicle having only anti-lock control.

The single slaved dump valve is a 2-way/2-position solenoid valve including a first port connected to a central return conduit and a second port connected to a source of pressurized fluid. Two wheel brake cylinders are connected to the central return conduit by separate return conduits. Each separate return conduit contains a restrictor and a check valve. The check valves are oriented to prevent fluid from flowing from one wheel brake cylinder to the other thereby preventing the pressure at each wheel brake cylinder from affecting the other. The wheel brake cylinders are supplied with fluid from a pressurized fluid source. Each wheel brake cylinder has a corresponding inlet valve which is independently controlled to pass pressurized fluid so that different pressures can be achieved at each wheel brake cylinder.

The restrictors, in combination with the check valves, allow separate pressure regulation of each wheel brake cylinder connected to the single dump valve by maintaining the pressure differential between the wheel brake cylinders when the dump valve is open. Fully independent control of the fluid pressure at the wheel brake cylinders connected to the single dump valve can be simulated by selectively actuating the inlet valves and dump valves. For instance, the left wheel brake cylinder pressure can be reduced while the right wheel brake cylinder pressure can be held constant if the right isolation valve is opened while the dump valve is opened. Proper electronic control can precisely simulate independent regulation of the pressures at the wheel brake cylinders connected to the single dump valve.

Other features and advantages of the present invention will become readily apparent to one skilled in the art from reading the following detailed description in conjunction with the attached drawings.

DESCRIPTION OF THE PREFERRED EMBODIMENTS

Figure 1:
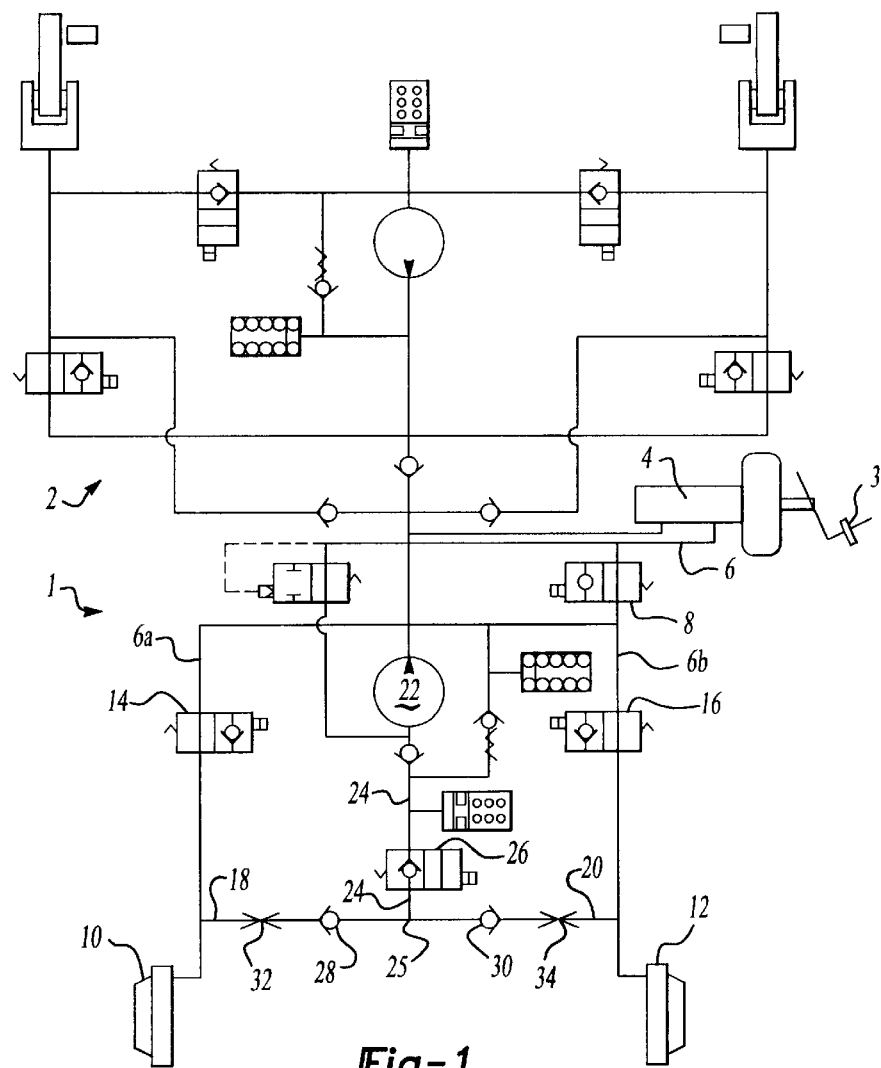
FIG. 1 is a schematic view of an ABS and TC system in accordance with this invention.

FIG. 1 is a schematic view of an anti-lock and traction control system incorporating the present invention for use on a two-wheel drive vehicle having a dual braking circuit. The braking circuit is split between the front and rear brakes of the vehicle. The rear wheels are driven and traction control is included in a rear brake circuit 1. A master cylinder 4 is connected to both the front brake circuit 2 and the rear brake circuit 1 for providing pressurized fluid via hydraulic conduits to the front and rear wheel brake cylinders when a brake pedal 3 is depressed. For simplicity, only the rear brake circuit 1 is discussed below.

When the brake pedal 3 is depressed by the vehicle operator, the master cylinder 4 supplies hydraulic fluid under pressure to the rear brake circuit 1 through a supply conduit 6 and a switching valve 8. The switching valve 8 is a 2-way/2-position solenoid valve switchable between a normally open unenergized position and an energized position which prevents fluid from flowing back to the master cylinder 4 when traction control is activated. The supply conduit 6 branches off to form a left supply conduit 6a and a right supply conduit 6b for supplying pressurized fluid to the left rear wheel brake cylinder 10 and the right rear wheel brake cylinder 12, respectively.

A left inlet valve 14 is positioned in the left supply conduit 6a between the switching valve 8 and the left rear wheel brake cylinder 10. The inlet valve 14 is a 2-way/2-position solenoid valve switchable between a normally open unenergized position and an energized position which prevents fluid from flowing to the left wheel brake cylinder 10. When anti-lock or traction control is activated, the inlet valve 14 is cyclically pulsed between the unenergized and energized position to increase the pressure at the left wheel brake cylinder 10 during the apply mode described above. A right inlet valve 16 is positioned in the right supply conduit 6b between the switching valve 8 and the right rear wheel brake cylinder 12 and operates in a manner similar to the left inlet valve 14 described above.

A left return conduit 18 connects the left rear wheel brake cylinder 10 with a central return conduit 24. A right return conduit 20 connects the right rear wheel brake cylinder 12 with the central return conduit 24 forming a junction 25 between the left and right return conduits. The central return conduit 24 is connected to an inlet of an auxiliary pressurized fluid source, such as a pump 22. A single dump valve 26 is positioned in the central return conduit 24 between the left and right return conduit junction 25 and the auxiliary pressure source 22. The dump valve 26 is a 2-way/2-position solenoid valve having a first unenergized position for preventing fluid from flowing from the rear wheel brake cylinders 10 and 12 to the auxiliary pressure source 22. The dump valve 26 also has a second energized position which allows fluid to flow from the rear wheel brake cylinders 10 and 12 to the auxiliary pressure source 22. During dump mode, the dump valve 26 is cyclically pulsed between the unenergized and energized position to reduce the pressure at the rear wheel brake cylinders 10 and 12.

A left check valve 28 is positioned in the left return conduit 18 between the left rear wheel brake cylinder 10 and the junction 25 for preventing fluid from flowing from the junction 25 to the left rear wheel brake cylinder 10. A right check valve 30 is positioned in the right return conduit 20 between the right rear wheel brake cylinder 12 and the junction 25 for preventing fluid from flowing from the junction 25 to the right rear wheel brake cylinder 12. The left and right check valves 28 and 30 prevent fluid flow from one rear wheel brake cylinder to the other and thereby effectively isolate each rear wheel brake cylinder from the pressure at the other rear wheel brake cylinder when the dump valve 26 remains in its unenergized position.

A left restrictor 32 is positioned in the left return conduit 18 between the left rear wheel brake cylinder 10 and the left check valve 28. A right restrictor 34 is positioned in the right return conduit 20 between the right rear wheel brake cylinder 12 and the right check valve 30. Although the present embodiment shows the restrictors 32 and 34 positioned between the check valves 28 and 30 and the rear wheel brake cylinders 10 and 12, they may instead be positioned between the check valves 28 and 30 and the junction 25. The relative placement of the check valves 28 and 30 and restrictors 32 and 34 is not crucial to performance of this invention.

The restrictors 32 and 34 reduce the volume of fluid flowing from the rear wheel brake cylinders 10 and 12 and when combined with the check valves 28 and 30 effectively isolate each rear wheel brake cylinder from the pressure at the other when the dump valve 26 is switched to its energized position. When the dump valve 26 is energized it opens to allow fluid to flow from the rear wheel brake cylinders 10 and 12 to the auxiliary pressure source 22, thereby reducing the pressure at the rear wheels.

Figure 2:
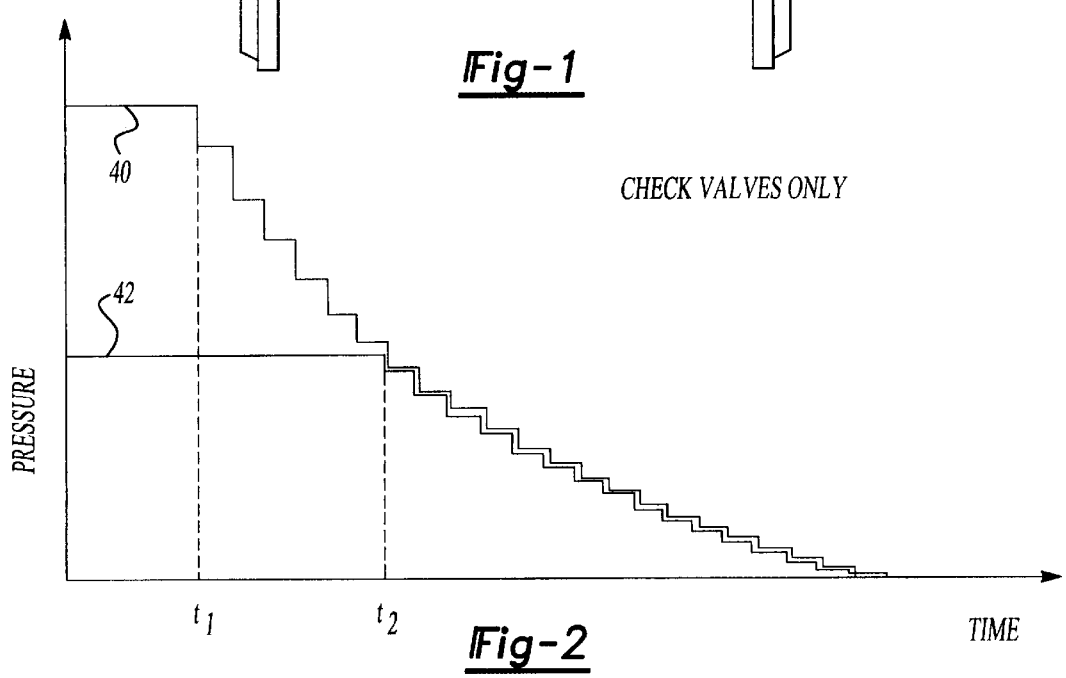
FIG. 2 is a graph illustrating the pressure at the wheel brakes of an ABS and TC system using a single dump valve, separate check valves and no restrictors.
Figure 3:
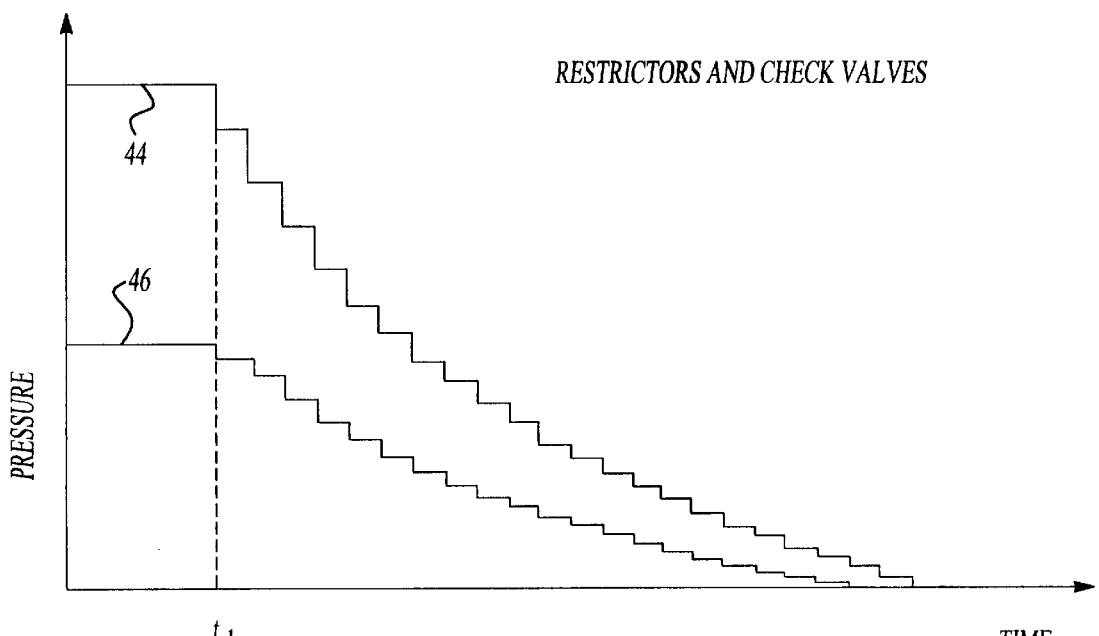
FIG. 3 is a graph illustrating the pressure at the wheel brakes of an ABS and TC system using a single dump valve, separate check valves and restrictors.

Referring now to FIGS. 2 and 3, the difference in pressure reduction at the rear wheel brake cylinders 10 and 12 using check valves 28 and 30 only compared to restrictors 32 and 34 and check valves 28 and 30 is illustrated FIG. 2 is a pressure diagram showing how the rear left and right pressures vary with time when check valves 28 and 30 without restrictors 32 and 34 are used and the dump valve 26 is energized during the dump mode. A pressure differential exists between the rear left and right wheels which illustrates the advantages of the restrictor/check valve combination. The left rear wheel brake cylinder pressure 40 can be greater than the right rear wheel brake cylinder pressure 42 if the left inlet valve 14 remains open longer than the right inlet valve 16. This pressure differential may be developed in actual anti-lock conditions when the vehicle is braked on a split-mu surface having a different coefficient of friction at the left and right wheels. Optimum vehicle braking would require higher braking forces at the wheels on the surface with the greater coefficient of friction which would lead to greater wheel brake cylinder pressures for the brakes of those wheels.

When the single dump valve 26 is energized to allow fluid to pass through, the system without the restrictors 32 and 34 loses the pressure differential at the rear wheel brake cylinders 10 and 12 connected to the single dump valve 26. FIG. 2 shows how the greater pressure at the left wheel brake cylinder 40 is reduced when the dump valve 26 is pulsed open starting at time $t_1$. Without using restrictors, the lower pressure 42 at the right rear wheel brake cylinder 12 remains constant until the pressures at both rear wheel brake cylinders 10 and 12 are equalized. This occurs because the pressure of the fluid flowing through the left check valve 28 is higher than the pressure at the right rear wheel brake cylinder 12. This pressure differential keeps the right check valve 30 closed, thereby preventing pressure reduction at the right rear wheel brake cylinder 12 until the pressure at the junction 25 approximately equals the right wheel brake cylinder pressure 42. The pressures on each side of the right check valve 30 are equalized at $t_2$ and the right rear wheel brake cylinder pressure 42 begins to decrease while remaining approximately equal to the left wheel brake cylinder pressure 40. This pressure response demonstrates the loss of independent control of the pressures at the rear wheel brake cylinders 10 and 12 connected to the single dump valve 26 when the dump valve 26 is opened and only check valves 28 and 30 are used.

FIG. 3 illustrates how the combination of restrictors 32 and 34 and check valves 28 and 30 effectively isolate the pressure at each rear wheel brake cylinder from the pressure at the other rear wheel brake cylinder when the dump valve 26 is opened during the dump mode explained above. The dump valve 26 is energized at time $t_1$ to allow the pressurized fluid to pass through and thereby reduce the pressure at the left and right rear wheel brake cylinders 10 and 12. The restrictor/check valve combinations allow both the high left rear brake cylinder pressure 44 and the low right rear brake cylinder pressure 46 to be reduced when entering the dump mode. Any pressure differential that may exist between the rear wheel brake cylinders 10 and 12 will be maintained when the dump valve 26 is opened. The immediate pressure reduction at the low pressure wheel brake cylinder allows for improved brake response at the wheel on the surface having the lower coefficient of friction. This will reduce the amount of wheel lock-up on a split-mu surface and improve vehicle stability.

Figure 4:
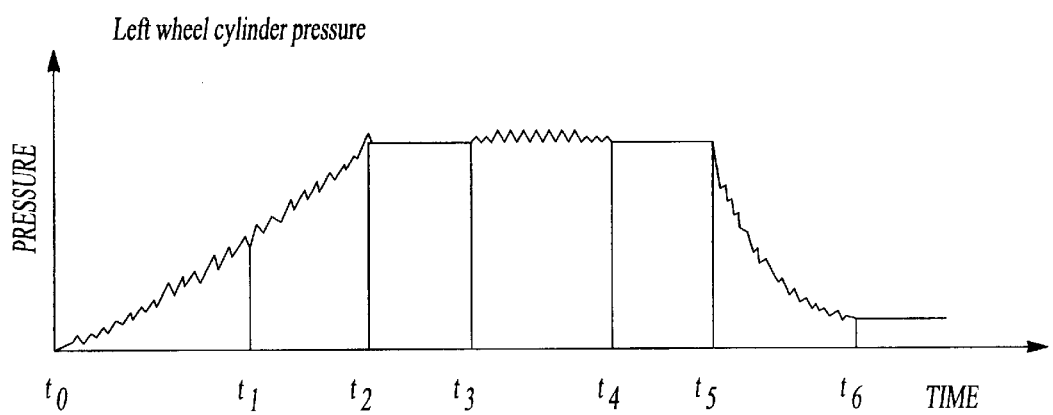
FIG. 4 is a graph illustrating the independent pressure control of the pressure at the left and right wheel brake cylinder for the system of FIG. 1.
Figure 4:
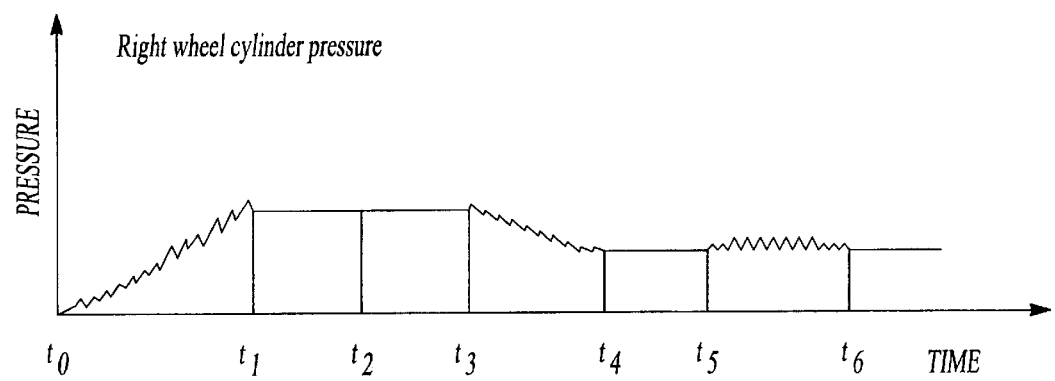

Referring now to FIG. 4, there is shown a pressure diagram for the left and right rear wheel brake pressures during several apply, hold and dump modes. The diagram illustrates how the invention simulates independent control of the pressures at wheel brake cylinders connected to a single dump valve 26. At $t_0$ the single dump valve 26 is closed and the left and right inlet valves 14 and 16 are opened to admit pressurized fluid to the rear wheel brake cylinders 10 and 12 respectively. At $t_1$, the right inlet valve 16 remains closed thereby keeping the right rear wheel brake cylinder pressure constant while the left inlet valve 14 continues to be pulsed open increasing the pressure at the left rear wheel brake cylinder 10. At $t_2$, the left inlet valve 14 is no longer pulsed open and a constant pressure is maintained at the left rear wheel brake cylinder 10. At $t_3$, the dump valve 26 and the left inlet valve 14 are pulsed open. The pressure at the right rear wheel brake cylinder 12 is reduced through the dump valve 26 while the pressure at the left rear wheel brake cylinder 10 is held constant by the fluid flow through the open left inlet valve 14.

The dump valve 26 and the left inlet valve 14 are no longer pulsed open at $t_4$ and the pressures at both rear wheel brake cylinders 10 and 12 remain constant. At $t_5$, the dump valve 26 and the right inlet valve 16 are pulsed open. The pressure at the left rear wheel brake cylinder 10 is reduced through the dump valve 26 while the pressure at the right rear wheel brake cylinder 12 is held constant by the fluid flow through the open right inlet valve 16. Thus independent control of both rear wheel brake cylinders 10 and 12 connected to the single dump valve 26 can be simulated by using the restrictors 32 and 34 and check valves 28 and 30 and proper coordination of the inlet valves 14 and 16 and the dump valve 26.

Figure 5:
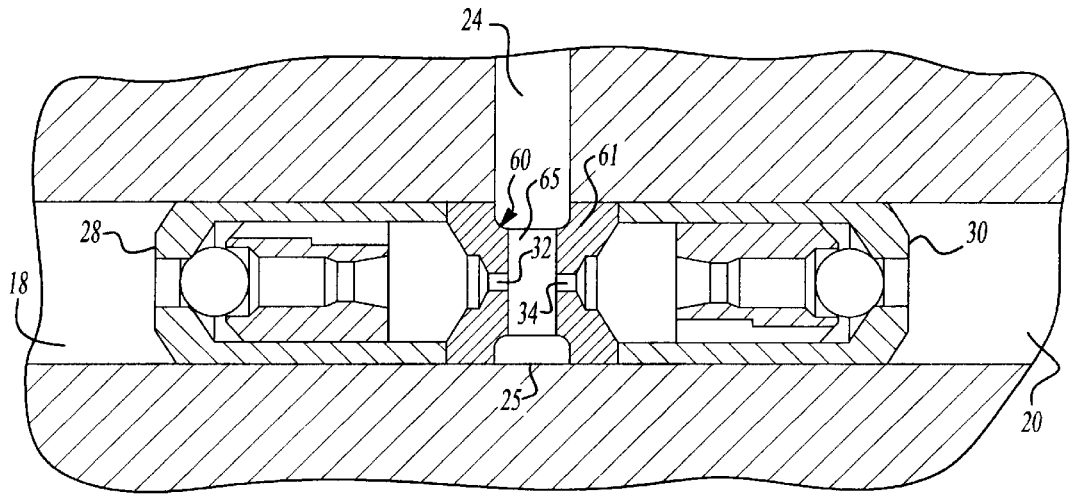
FIG. 5 is a sectional view of the check valves and restrictor assembly of the system illustrated in FIG. 1.

Referring now to FIG. 5, check valves 28 and 30 are shown in combination with a tandem restrictor assembly 60. Tandem restrictor assembly 60 includes a housing 61 containing two separate restrictors 32 and 34 and is located at the intersection of conduits 18, 20 and 24 (which is junction 25). The diameters of orifices of the restrictors 32 and 34 are smaller than the diameters of the connecting conduits 18, 20 and 24. The restrictors 32 and 34 are connected by a central bore 65. As stated above, the restrictors 32 and 34 can be located between the check valves 28 and 30. Check valve 28 is located in conduit 18 and check valve 30 is located in conduit 20. The central bore 65 communicates with conduit 24 which leads to the dump valve 26.

Figure 6:
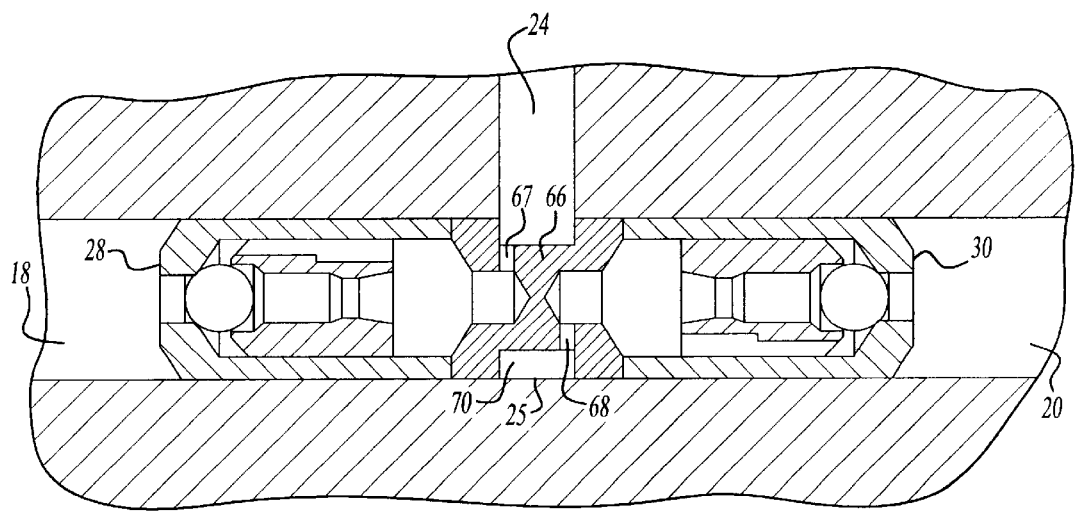
FIG. 6. is an alternate embodiment of the check valves and restrictor assembly in accordance with this invention.

Referring now to FIG. 6, an alternate embodiment of the tandem restrictor assembly 66 is shown in combination with check valves 28 and 30. The tandem restrictor assembly 66 is positioned in the intersection of conduits 18, 20, and 24 (junction 25) and between the check valves 28 and 30 as in FIG. 5. This tandem restrictor assembly 66 has two restrictors 67 and 68 but they are not connected to a central bore. Restrictor 67 leads directly to conduit 24 and restrictor 68 leads to cavity 70 which is an annular cavity encircling the tandem restrictor assembly 66, thereby indirectly leading to cavity 24. This embodiment prevents the restrictors 67 and 68 from spewing high pressure fluid towards each other which can create interference between them.

The present invention has been illustrated and described in its preferred embodiments. However, it will be appreciated that the present invention can be practiced in a manner other than that specifically illustrated and described.

What is claimed is:

1. A hydraulic braking system comprising:
    a source of pressurized fluid;
    a first wheel brake cylinder connected to said source of pressurized fluid through a hydraulic conduit;
    a second wheel brake cylinder connected to said source of pressurized fluid through a hydraulic conduit;
    a first inlet valve connected between said source of pressurized fluid and said first wheel brake cylinder for selectively controlling the fluid pressure to said first wheel brake cylinder;
    a second inlet valve connected between said source of pressurized fluid and said second wheel brake cylinder for selectively controlling the fluid pressure to said second wheel brake cylinder;
    a switching valve connected between said source of pressurized fluid and said first and second inlet valves for selectively controlling fluid from and to the source of pressurized fluid;
    a first return conduit connected between said first wheel brake cylinder and said pressurized fluid source;
    a second return conduit connected between said second wheel brake cylinder and said pressurized fluid source;
    a dump valve connected to said first and second return conduits, said dump valve switchable between a first position for preventing fluid flow from said first and second wheel brake cylinders to said pressurized fluid source and a second position for allowing fluid to flow from said first and second wheel brake cylinders to said pressurized fluid source;
    a first check valve disposed in said first return conduit for preventing fluid flow from said second wheel brake cylinder to said first wheel brake cylinder;
    a second check valve disposed in said second return conduit for preventing fluid flow from said first wheel brake cylinder to said second wheel brake cylinder;
    a first restrictor disposed in said first return conduit between said dump valve and said first wheel brake cylinder; and
    a second restrictor disposed in said second return conduit between said dump valve and said second wheel brake cylinder.

2. The hydraulic braking system defined in claim 1 wherein a junction is formed at an intersection of the first and second return conduits.

3. The hydraulic braking system defined in claim 2 wherein the first check valve is disposed between the junction and the first wheel brake cylinder and the first restrictor is disposed between the first check valve and the first wheel brake cylinder.

4. The hydraulic braking system defined in claim 2 wherein the second check valve is disposed between the junction and the second wheel brake cylinder and the second restrictor is disposed between the second check valve and the second wheel brake cylinder.

5. The hydraulic braking system defined in claim 2 wherein the first check valve is disposed between the junction and the first wheel brake cylinder and the first restrictor is disposed between the first check valve and junction.

6. The hydraulic braking system defined in claim 2 wherein the second check valve is disposed between the junction and the second wheel brake cylinder and the second restrictor is disposed between the second check valve and the junction.

7. The hydraulic braking system defined in claim 1 wherein the first restrictor includes an orifice having a diameter less than a diameter of the first return conduit.

8. The hydraulic braking system defined in claim 1 wherein the second restrictor includes an orifice having a diameter less than a diameter of the second return conduit.

9. The hydraulic braking system defined in claim 2 including a tandem restrictor assembly disposed at the junction, wherein the tandem restrictor assembly houses the first and second restrictors.

10. The hydraulic braking system defined in claim 9 including a central bore in the tandem restrictor assembly into which both of the first and second restrictors direct fluid to the dump valve.

11. The hydraulic braking system defined in claim 9 including an annular cavity in the tandem restrictor assembly into which one of the first or second restrictors direct fluid.

12. A hydraulic braking system comprising:

a source of pressurized fluid;

a first wheel brake cylinder connected to said source of pressurized fluid through a hydraulic conduit;

a second wheel brake cylinder connected to said source of pressurized fluid through a hydraulic conduit;

a switching valve connected between said source of pressurized fluid and said first and second wheel brake cylinders for selectively controlling fluid from and to the source of pressurized fluid;

a first return conduit connected between said first wheel brake cylinder and said pressurized fluid source;

a second return conduit connected between said second wheel brake cylinder and said pressurized fluid source;

a dump valve connected to said first and second return conduits, said dump valve switchable between a first position for preventing fluid flow from said first and second wheel brake cylinders to said pressurized fluid source and a second position for allowing fluid to flow from said first and second wheel brake cylinders to said pressurized fluid source;

a first check valve disposed in said first return conduit for preventing fluid flow from said second wheel brake cylinder to said first wheel brake cylinder;

a second check valve disposed in said second return conduit for preventing fluid flow from said first wheel brake cylinder to said second wheel brake cylinder;

a first restrictor disposed in said first return conduit between said dump valve and said first wheel brake cylinder; and a second restrictor disposed in said second return conduit between said dump valve and said second wheel brake cylinder.

13. The hydraulic braking system defined in claim 12 wherein a junction is formed at an intersection of the first and second return conduits.

14. The hydraulic braking system defined in claim 13 wherein the first check valve is disposed between the junction and the first wheel brake cylinder and the first restrictor is disposed between the first check valve and the first wheel brake cylinder.

15. The hydraulic braking system defined in claim 13 wherein the second check valve is disposed between the junction and the second wheel brake cylinder and the second restrictor is disposed between the second check valve and the second wheel brake cylinder.

16. The hydraulic braking system defined in claim 13 wherein the first check valve is disposed between the junction and the first wheel brake cylinder and the first restrictor is disposed between the first check valve and junction.

17. The hydraulic braking system defined in claim 13 wherein the second check valve is disposed between the junction and the second wheel brake cylinder and the second restrictor is disposed between the second check valve and the junction.

18. A hydraulic braking system comprising:

a first wheel brake cylinder;

a second wheel brake cylinder;

a first return conduit connected to said first wheel brake cylinder;

a second return conduit connected to said second wheel brake cylinder;

an intersection of the first and second return conduits;

a third return conduit in communication with the intersection of the first and second return conduits;

a tandem restrictor disposed at said intersection of said first and second return conduits, the tandem restrictor including a housing having a first restrictor in communication with the first return conduit and the third return conduit and a second restrictor in communication with the second return conduit and the third return conduit, wherein the housing of the tandem restrictor includes a central bore into which each of the first and second restrictors is in fluid communication.

* * * * *